United States Patent
Ries et al.

(10) Patent No.: US 12,181,303 B2
(45) Date of Patent: Dec. 31, 2024

(54) METHOD FOR CONTROLLING A VEHICLE SYSTEM OF A VEHICLE EQUIPPED FOR CARRYING OUT AN AUTOMATED DRIVING OPERATION AND DEVICE FOR CARRYING OUT THE METHOD

(71) Applicant: DAIMLER AG, Stuttgart (DE)

(72) Inventors: Florian Ries, Stuttgart (DE); Frank Schuster, Böblingen (DE); Martin Haueis, Gärtringen (DE); Mohammad Ghanaat, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 496 days.

(21) Appl. No.: 17/058,253

(22) PCT Filed: Apr. 10, 2019

(86) PCT No.: PCT/EP2019/059164
§ 371 (c)(1),
(2) Date: Nov. 24, 2020

(87) PCT Pub. No.: WO2019/223931
PCT Pub. Date: Nov. 28, 2019

(65) Prior Publication Data
US 2021/0215503 A1 Jul. 15, 2021

(30) Foreign Application Priority Data
May 25, 2018 (DE) .................... 10 2018 004 229.5

(51) Int. Cl.
*G01C 21/00* (2006.01)
*B60W 60/00* (2020.01)

(52) U.S. Cl.
CPC ...... *G01C 21/3811* (2020.08); *G01C 21/3815* (2020.08); *G01C 21/3844* (2020.08); *B60W 60/001* (2020.02)

(58) Field of Classification Search
None
See application file for complete search history.

(56) References Cited

U.S. PATENT DOCUMENTS 9,630,616 B2    4/2017  Reichel et al.
9,821,818 B2   11/2017  Cullinane et al.
(Continued)

FOREIGN PATENT DOCUMENTS

CN    106335498 A    1/2017
CN    106715224 A    5/2017
(Continued)

OTHER PUBLICATIONS

Examination Report created on Jul. 17, 2019 in related/corresponding DE Application No. 10 2018 004 229.5.
(Continued)

*Primary Examiner* — Hunter B Lonsberry
*Assistant Examiner* — Paysun Wu
(74) *Attorney, Agent, or Firm* — PATENT PORTFOLIO BUILDERS PLLC

(57) ABSTRACT

A method for controlling a vehicle system of a vehicle which is equipped to carry out an automated driving operation involves localizing the vehicle and approving the vehicle system for activation depending on a result of the localization. The vehicle is localized with at least two different localization methods. The at least two localization methods include at least one landmark-based localization method and one localization method based on at least one global navigation satellite system. The vehicle system is only approved for activation if it is confirmed with each of the applied
(Continued)

Figure 1:
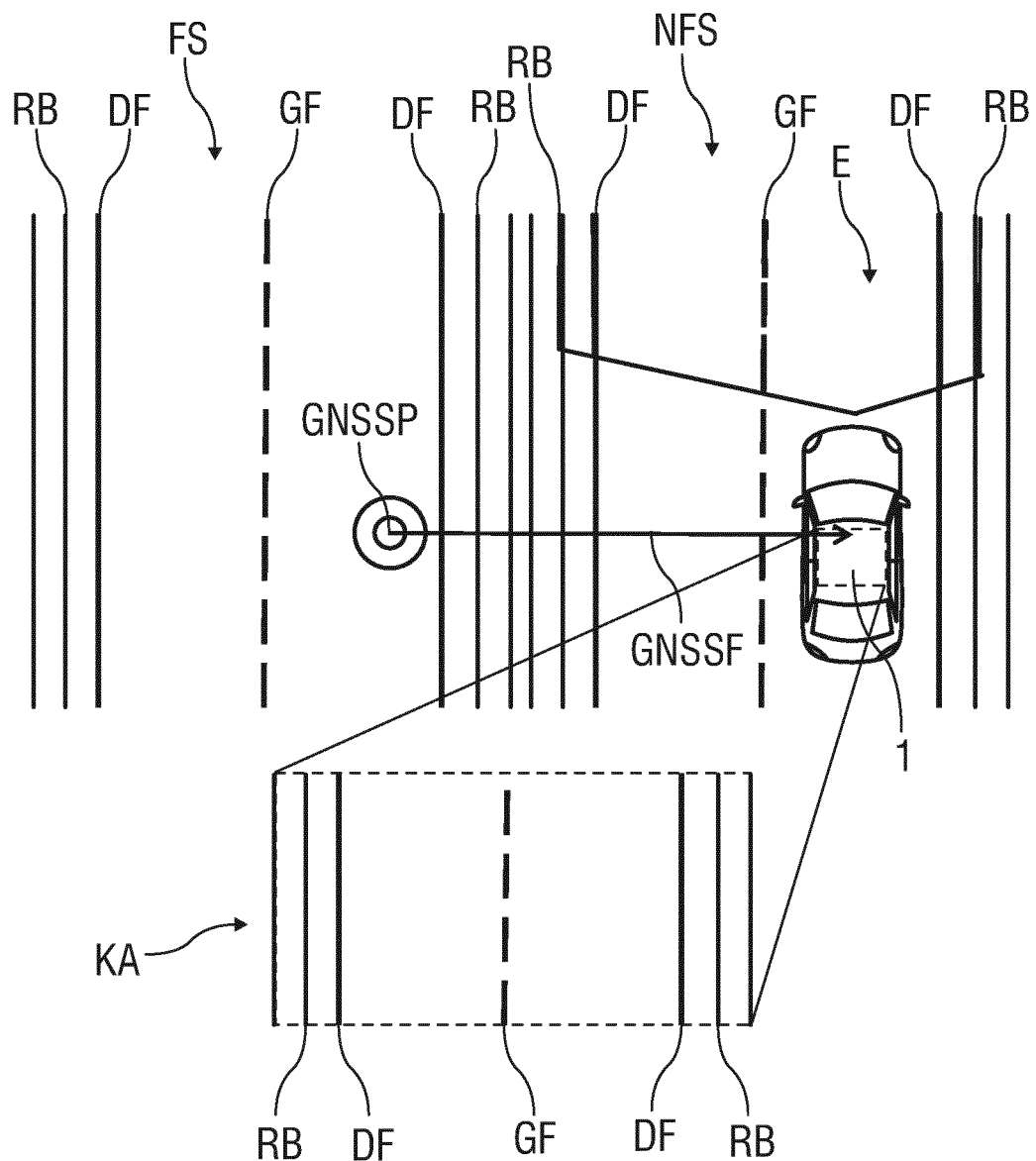

localization methods that the vehicle is located on a route section approved for automated driving operation.

9 Claims, 8 Drawing Sheets

(56) References Cited

U.S. PATENT DOCUMENTS

| | | | |
|---|---|---|---|
| 9,902,396 B2 | 2/2018 | Itagaki | |
| 9,919,716 B2* | 3/2018 | Christensen | G06V 20/588 |
| 2006/0064202 A1* | 3/2006 | Gutmann | G05D 1/0251 |
| | | | 700/245 |
| 2011/0118979 A1 | 5/2011 | Mao et al. | |
| 2015/0378015 A1 | 12/2015 | You et al. | |
| 2016/0375912 A1 | 12/2016 | Christensen et al. | |
| 2017/0305420 A1 | 10/2017 | Desens et al. | |
| 2020/0033463 A1* | 1/2020 | Lee | H04W 64/00 |
| 2020/0385014 A1* | 12/2020 | Hanniel | B60W 60/001 |

FOREIGN PATENT DOCUMENTS

| | | |
|---|---|---|
| CN | 107097780 A | 8/2017 |
| DE | 102012016802 A1 | 2/2014 |
| DE | 102014014120 A1 | 4/2015 |
| DE | 102014221473 A1 | 12/2015 |
| DE | 102015008879 A1 | 3/2016 |
| DE | 102016009117 A1 | 2/2017 |
| EP | 3109115 A1 | 12/2016 |
| EP | 3276587 A1 | 1/2018 |
| KR | 20090029129 A | 3/2009 |
| KR | 20120112293 A | 10/2012 |

OTHER PUBLICATIONS

International Search Report mailed on Sep. 24, 2019 in related/corresponding International Application No. PCT/EP2019/059164.
Written Opinion mailed on Sep. 24, 2019 in related/corresponding International Application No. PCT/EP2019/059164.
Office Action dated Sep. 28, 2023 in related/corresponding CN Application No. 201980034877.3.

* cited by examiner

METHOD FOR CONTROLLING A VEHICLE SYSTEM OF A VEHICLE EQUIPPED FOR CARRYING OUT AN AUTOMATED DRIVING OPERATION AND DEVICE FOR CARRYING OUT THE METHOD

BACKGROUND AND SUMMARY OF THE INVENTION

Exemplary embodiments of the invention relate to a method for controlling a vehicle system of a vehicle equipped to carry out an automated driving operation and a device for carrying out the method.

DE 10 2014 014 120 A1 discloses a functional release of a highly automated driving function. In a method for autonomous operation of a vehicle on a route ahead, the autonomous operation of the vehicle is only permitted if one condition is fulfilled or several conditions are fulfilled for a predetermined route length of the route ahead. The conditions are that there is a structural separation on at least one side of a current road of the vehicle, one lane of the vehicle has a minimum lane width, there are no peaks and dips which substantially limit the range of environmental detection sensors, the number of lanes does not change, there are no tunnels, there are no buildings on the road, there is no motorway junction, a curvature radius of the vehicle's lane is greater than a predetermined limit, there is no traffic disruption, there is no traffic report of dangerous situations and there is no traffic report of the presence of roadworks.

A method for locating a vehicle is described in DE 10 2016 009 117 A1. A localization of a vehicle based on environmental detection and a localization by means of a global navigation satellite system are merged.

A method for operating a motor vehicle location system is known from US 2011/0118979 A1. The method comprises providing a timely warning if the system cannot meet predetermined performance criteria. The method comprises determining a satellite-based position estimate, determining a dead reckoning position estimate, determining a localization estimate by combining the satellite-based position estimate and the dead reckoning position estimate, determining a position corresponding to a map and determining an integrity of the localization estimate by comparing a test statistic calculated by evaluating the determination of the position corresponding to the map and the localization estimate with a decision threshold based on a predetermined localization estimate accuracy specification. If the test statistic is lower than the decision threshold, the system provides the localization estimate. If the test statistic is greater than the decision threshold, the system provides an indication that the integrity of the localization estimate does not meet the predetermined localization estimation accuracy specification.

Exemplary embodiments of the invention are directed to a method which is improved compared to prior art for controlling a vehicle system of a vehicle equipped to carry out an automated driving operation and a device for carrying out the method.

In a method for controlling a vehicle system of a vehicle equipped to carry out an automated, in particular highly automated or autonomous, driving operation, the vehicle is localized and the vehicle system is approved for activation depending on a result of the localization, i.e., depending on the respective result of the localization, the vehicle system is either approved for activation or is not approved for activation.

According to the invention, the vehicle is localized with at least two different localization methods, wherein the at least two localization methods comprise at least one landmark-based localization method and one GNSS-based localization method, i.e., a localization method based on at least one Global Navigation Satellite System, in particular a DGNSS-based localization method, i.e., a localization method based on at least one Differential Global Navigation Satellite System. The vehicle system is only approved for activation if it is confirmed with each of the applied localization methods that the vehicle is on a route section approved for automated driving operation.

A device according to the invention for carrying out this method is in particular equipped to carry out this method. It is equipped to localize the vehicle and to release the vehicle system for activation depending on the result of the localization, wherein it is equipped to localize the vehicle with at least two different localization methods, wherein the at least two localization methods comprise at least one landmark-based localization method and one localization method based on at least one global navigation satellite system, and wherein it is equipped to release for activation only when it is confirmed with each of the applied localization methods that the vehicle is on a route section approved for automated driving operation.

By means of the method according to the invention and the device according to the invention for carrying it out, it is ensured that the vehicle is on a route section approved for automated driving operation. In this way, regulations, in particular legal regulations, for example, are complied with to carry out the automated driving operation, for example the requirements for automated driving functions of SAE level 3 (conditional automation). The requirements for a False Positive Rate of this test, whether the vehicle is on a route section approved for automated driving operation, are so strict due to possible fatal consequences of an unauthorized activation of the automated driving operation, for example, that both redundant and integrity-monitored mechanisms are necessary, as well as, for example, ensuring the correct position of the vehicle by two localization methods that are independent of each other. This is ensured by means of the solution according to the invention.

In particular, the solution according to the invention enables a street-specific localization with an ensured extremely small residual error rate, for example in the order of ASIL-D failure rates and better. Even very demanding SAE level 3 vehicle systems are thereby enabled and certifiable, where incorrect activation would immediately have the worst effects, for example a motorway pilot at higher speeds.

The solution according to the invention combines two completely independent, integral localization methods for ensuring a street-specific localization of the vehicle. On one hand, a DGNSS integrity monitor, for example RAIM (Receiver Autonomous Monitoring), is used to calculate a lateral protection limit, i.e., a guaranteed upper error limit. On the other hand, a high-precision map is used in particular, in which location-referenced landmarks are recorded, as well as a vehicle sensor system of the vehicle, which can observe them in the real world. An equally integrated method creates a sufficiently confusion-proof signature from these landmarks on both sides, i.e., on the side of the map and on the side of the vehicle sensors and compares them with each other. As with methods such as RAIM, a maximum false positive rate can be mathematically guaranteed.

By way of example, in the landmark-based localization method, a most probable position of the vehicle in the digital map and a similarity measure of the signature match are determined by comparing landmark signatures determined by sensors with landmark signatures taken from a, in particular high-resolution, digital map. A confirmation that the vehicle is located on a route section approved for automated driving operation is advantageously only issued if the most probable position determined is located on this route section approved for automated driving operation and if the determined similarity measure exceeds a predetermined similarity threshold. This considerably reduces the probability of an incorrect localization.

By way of example, the determined most probable position is compared with a satellite-based determined position, i.e., with a position determined by means of the localization method based on the at least one global navigation satellite system, and in particular is only evaluated as plausible if the two determined positions are close together, in particular if they are within a predetermined maximum distance from each other. Otherwise, the determined most probable position is rejected as implausible. Thus, a plausibility check of the localization is carried out, such that an approval to activate the automated driving operation is prevented in the case of an implausible localization. A confirmation that the vehicle is located on a route section approved for automated driving operation is therefore advantageously only issued if the most probable position determined has been assessed as plausible.

By way of example, in the GNSS-based localization method, i.e., the localization method based on the at least one global navigation satellite system, a current position of the vehicle (GNSS position) is determined based on a satellite, an upper error limit (protection limit PL) for the expected deviation of an actual vehicle position from the determined current position of the vehicle is determined, and a target limit (alert limit AL) is defined in such a way that an area covered by the target limit does not comprise areas of neighboring roads. A confirmation that the vehicle is on a route section approved for automated driving operation is advantageously only issued if the determined upper error limit is within the range covered by the target limit. This prevents an approval to activate the automated driving operation occurring if the vehicle is not on the approved route section, but rather on a neighboring road, for example not on a route section of a motorway, which is approved for the automated driving operation, but rather on a parallel route section of a neighboring country road, which is not approved for the automated driving operation.

For the GNSS-based localization method, i.e., the localization method based on at least one global navigation satellite system, RAIM (Receiver Autonomous Monitoring) is used, for example. This is a method known from aeronautical engineering to assess the integrity (measure of confidence that can be placed in the determined GNSS position) of a determined GNSS position. RAIM is based on the fact that signals from four satellites are required for satellite-based localization, and if more than four satellites are available, a limit (upper error limit (protection limit PL)) can be defined around a localization point (GNSS position) which contains the actual position with a high degree of certainty.

The target limit (alert limit), which is set around the currently determined GNSS position of the vehicle, defines the area in which the vehicle must actually be located if the determination that the vehicle is on a route section approved for automated driving operation is to be trusted. If the upper error limit (protection limit PL) is lower than the alert target limit (alert limit), the actual position of the vehicle is most likely to be on a route section approved for automated driving. However, if the upper error limit (protection limit PL) is greater than the target limit (alert limit), it cannot be excluded that the vehicle is located on a route section not approved for automated operation, even though the determined GNSS position is located on a route section approved for automated operation. In this case, the localization result is uncertain and is therefore not taken into account when deciding whether to allow the automated driving operation. This means that the vehicle system for carrying out the automated driving operation is not approved for activation.

By way of example, for the landmark-based localization method, a map section of the digital map is downloaded from a server external to the vehicle, which is assigned to a current position of the vehicle determined by the localization method based on the at least one global navigation satellite system. This enables the use of a high-resolution digital map which contains a lot of detailed information and thus requires a large amount of memory space and processing. The required memory space in the vehicle and the required processing are reduced by not storing and processing the entire digital map in the vehicle, but by downloading only a relevant map section of the digital map in each case.

In the landmark-supported localization, the current (inaccurate) position of the vehicle is determined in a satellite-supported manner and the map section of the high-resolution digital map (HAD map) assigned to the current position is downloaded from a server external to the vehicle. Landmark signatures are extracted from the digital map. Landmark signatures are detected by sensors using a vehicle sensor system. For the determined landmark signatures, a plurality of position hypotheses are generated representing the position of the vehicle. By comparing the position hypotheses, it is checked which of the hypotheses are most similar. Where the similar hypotheses accumulate, the position hypotheses corresponding to the most probable position is found. From the distribution of the accumulation, one can see how similar the landmark signatures are and with what certainty one can assume that the determined most probable position corresponds to the actual position.

The device for carrying out the method comprises in particular at least one receiver for signals from at least one global navigation satellite system and a vehicle sensor system, in particular comprising at least one sensor or a plurality of identical and/or different sensors, for detecting landmark signatures. Furthermore, the device comprises, in particular, at least one digital map and/or at least one communication interface for communication with a server external to the vehicle for downloading at least one map section of the digital map. Furthermore, the device comprises, in particular, at least one processing unit, in particular for carrying out one or more or all of the above-mentioned methods. Thus advantageously, the above described method with all its forms can be carried out and the resulting advantages can be achieved.

Exemplary embodiments of the invention are explained in more detail below using drawings.

BRIEF DESCRIPTION OF THE DRAWING FIGURES

Figure 2:
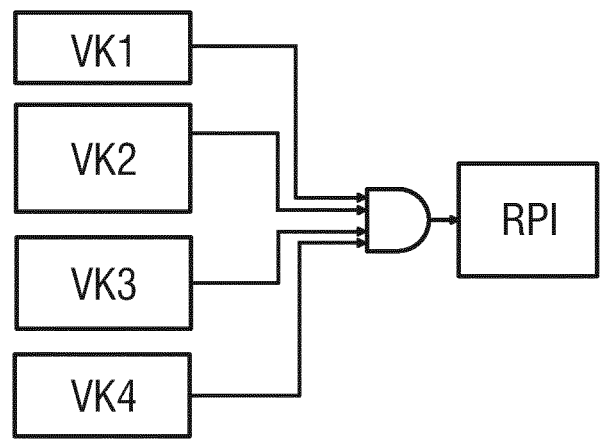
Figure 3:
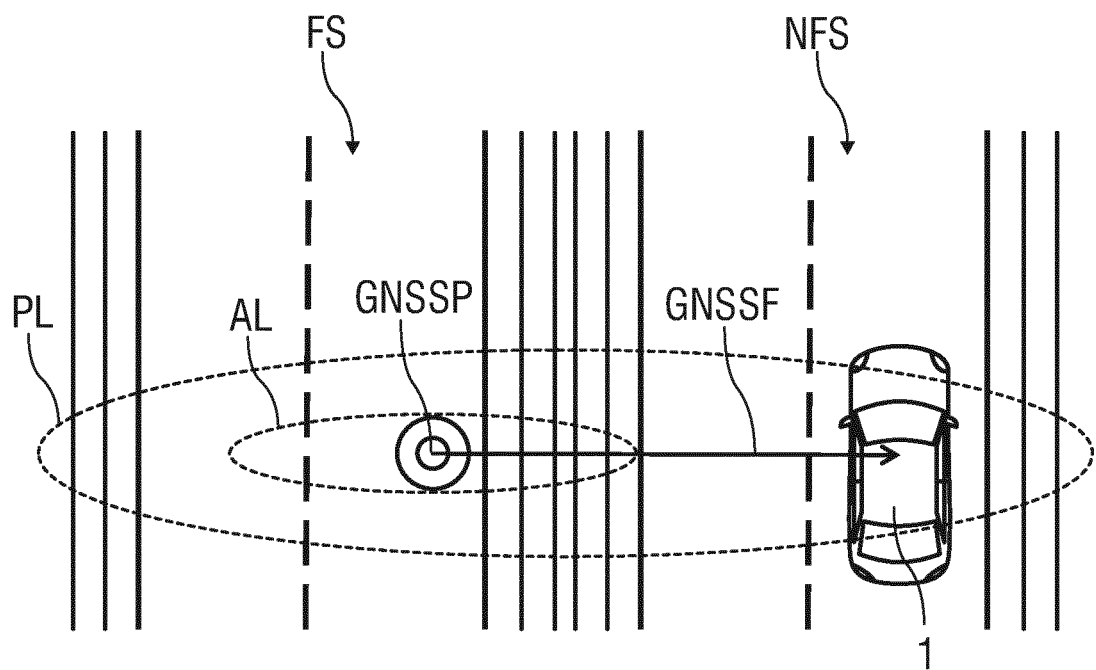
Figure 4:
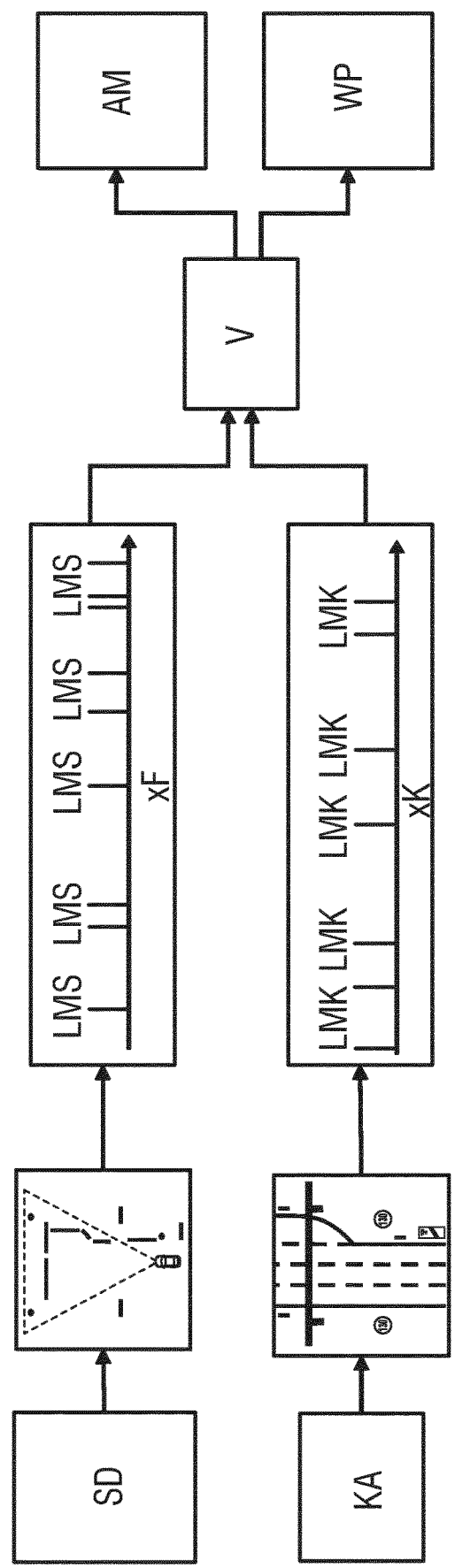
Figure 5:
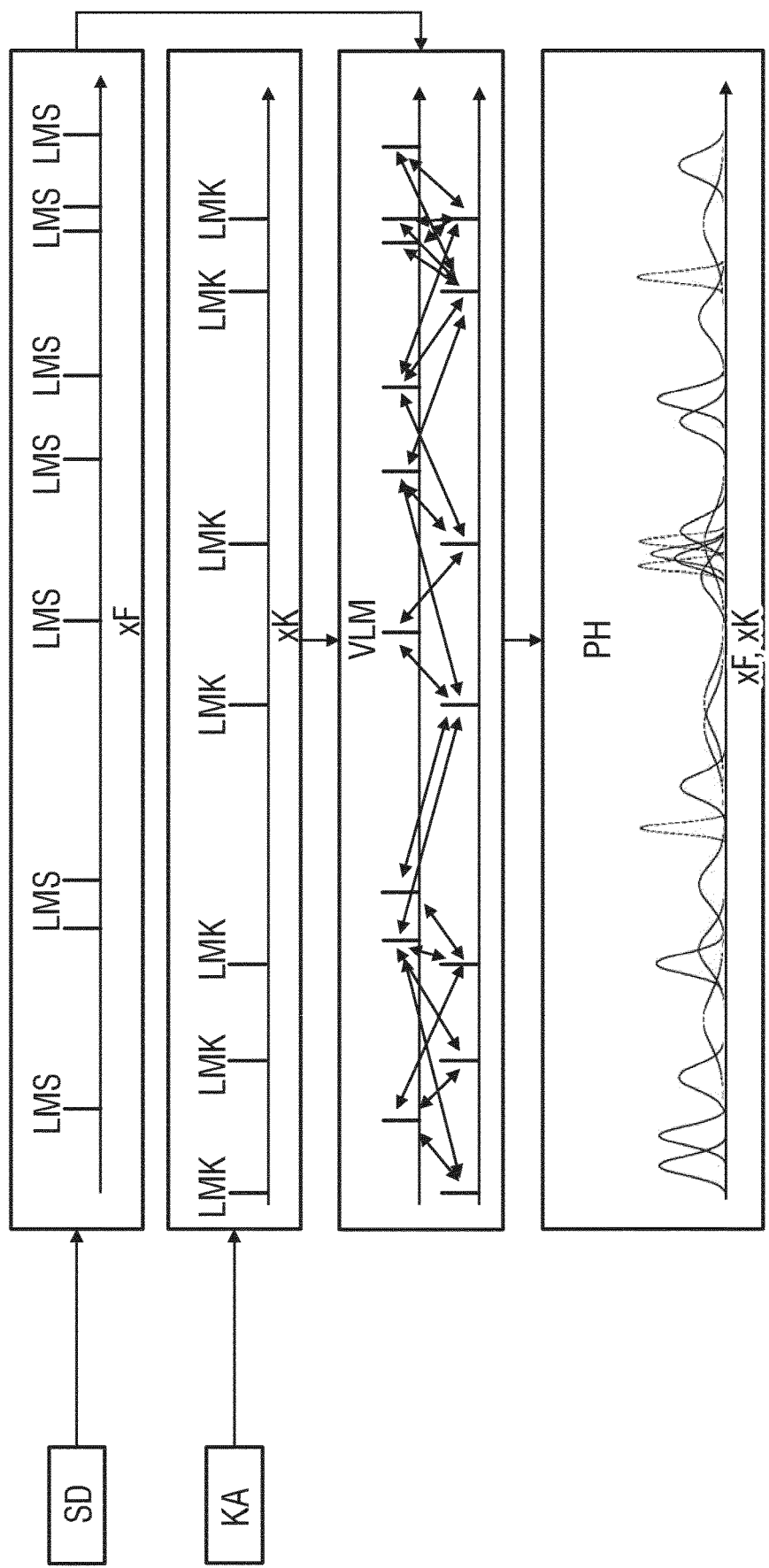
Figure 6:
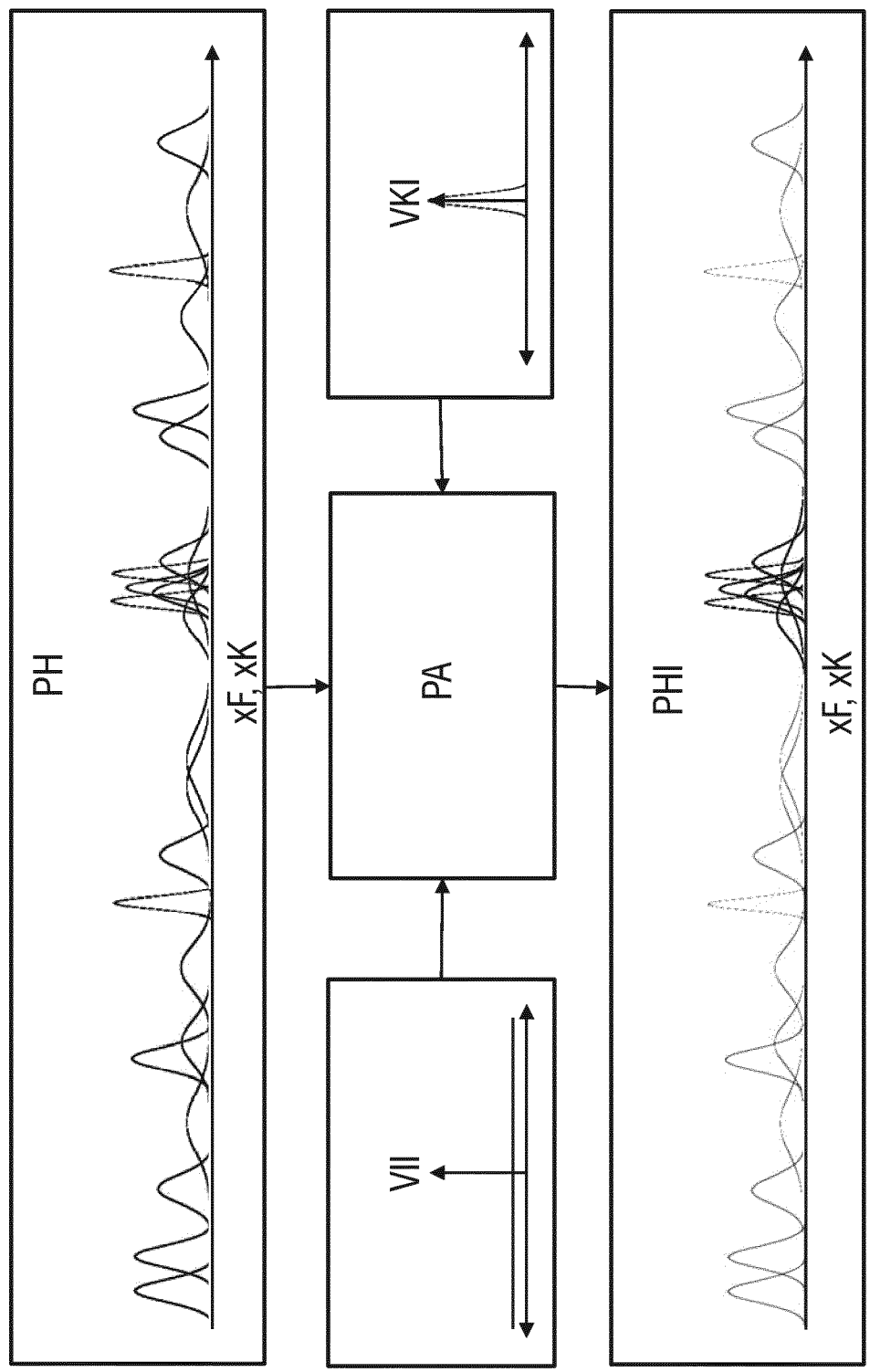
Figure 7:
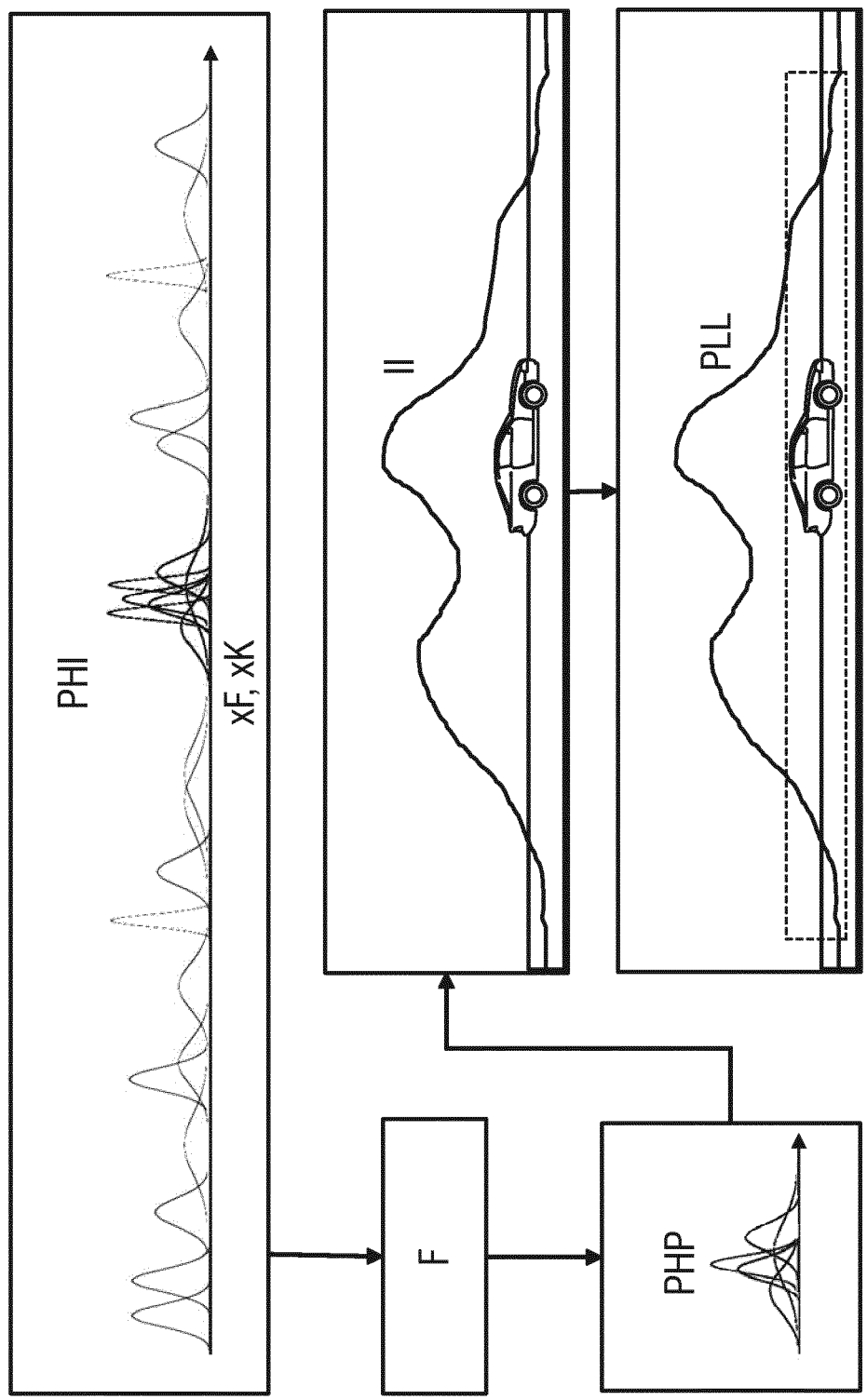
Figure 8:
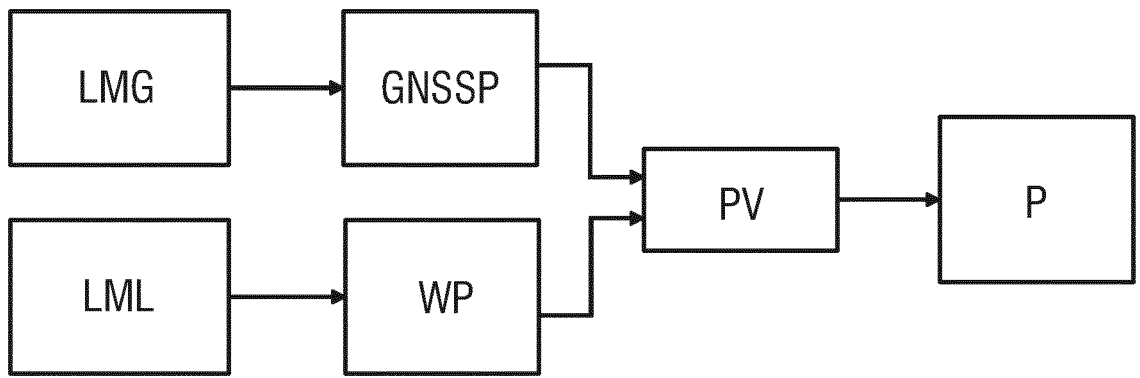
Figure 9:
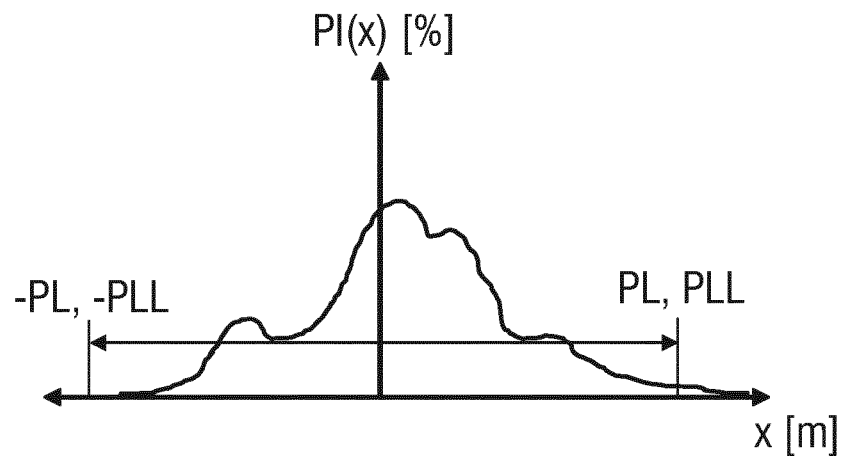
Figure 10:
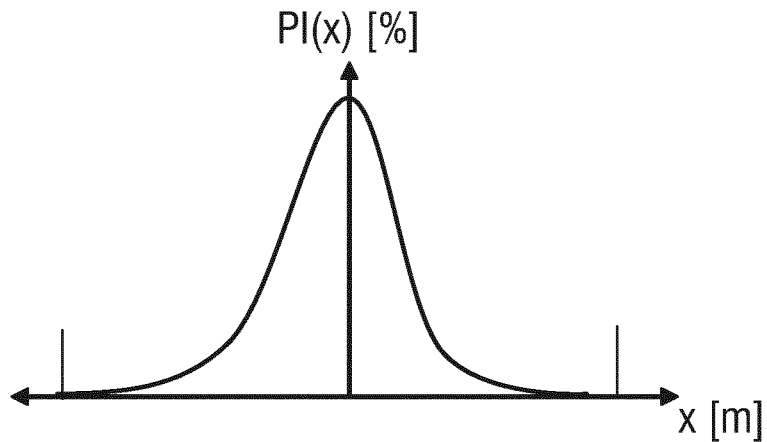
Figure 11:
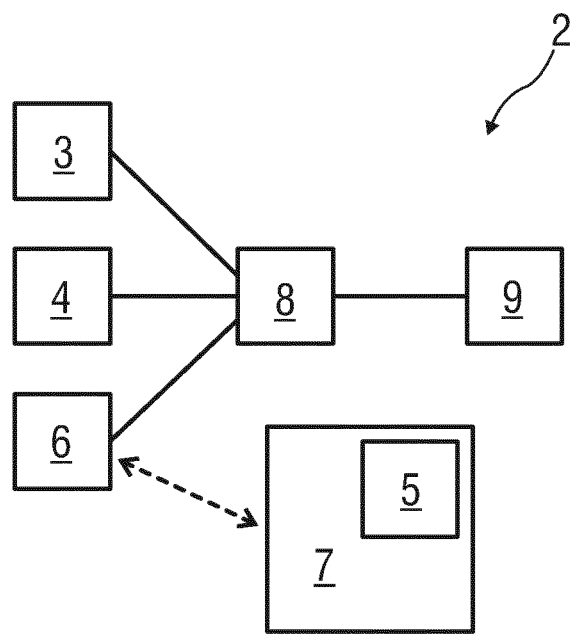

Here are shown:

FIG. 1 schematically, an incorrect localization of a vehicle,

FIG. 2 schematically, a process sequence of a localization of a vehicle,

FIG. 3 schematically, a localization method based on at least one global navigation satellite system, FIG. 4 schematically, a landmark-based localization method, FIG. 5 schematically, a comparison of landmark objects from sensor data with landmark objects on a map, FIG. 6 schematically, a probabilistic analysis, FIG. 7 schematically, an integration of information, FIG. 8 schematically, a plausibility check of a localization, FIG. 9 schematically, an actual distribution of errors, FIG. 10 schematically, an assumed distribution of errors, and FIG. 11 schematically, a device for carrying out a method for controlling a vehicle system of a vehicle equipped to carry out an automated driving operation.

DETAILED DESCRIPTION

Parts corresponding to one another are provided with the same reference numerals in all figures.

Using FIGS. 1 to 11, a method is described in the following for controlling a vehicle system 9 of a vehicle 1 equipped to carry out an automated, in particular highly automated or autonomous, driving operation and a device 2 for carrying out this method. Such an automated driving operation, in particular highly automated driving operation (HAF), shall only be possible if certain conditions are fulfilled.

One of the conditions is that a route section FS of a road on which the vehicle 1 is located is approved for automated driving operation. If the vehicle 1 is located on a route section NFS that is not approved for automated driving operation, a driver shall not be able to activate the vehicle system 9 to carry out the automated driving operation. The corresponding driving function is then disabled.

The method described in more detail below shall thus ensure that the vehicle system 9 cannot be activated to carry out automated driving operation on route sections NFS that are not approved for automated driving operation. For the activation of the vehicle system 9 for carrying out automated driving operation, it must therefore at least be checked whether the vehicle 1 is located on a route section FS that is approved for automated driving operation (route approval), and the vehicle system 9 for carrying out the automated driving operation must be approved or disabled for activation depending on this test result.

Information about the approval of the respective route section FS for automated driving operation can be taken, for example, as an attribute of a road from a digital map 5, or it can be retrieved from a server 7 for a preceding route, or it can be determined, as described in DE 102014 014 120 A1, the complete content of which is hereby incorporated by reference, depending on various features of the road, for example the motorway of motorway-like road with structurally separate directional lanes, and depending on a traffic situation, for example no traffic, no roadworks etc.

In any case, it is necessary to reliably determine on which route section FS, NFS the vehicle 1 is located. A danger is that a localization by means of a global navigation satellite system (GNSS) and by comparing road features taken from a digital map 5 with corresponding road features determined by sensors might give a wrong result, as shown in FIG. 1 and described in more detail below. This can have potentially fatal consequences, because if the vehicle 1 is localized incorrectly, the automated driving operation can possibly be activated on a route section NFS that is not approved for this purpose and on which, for example, traffic situations can occur for which the vehicle system 9 is not designed to carry out the automated driving operation, for example, oncoming traffic, intersecting traffic, pedestrians and cyclists.

The method described in more detail in the following enables a localization of the vehicle 1 in such a way that it can be determined with a high degree of reliability whether the vehicle 1 is located on a certain route section FS, NFS, in particular on a route section FS, that is approved for automated driving operation. By way of example, false positive rates of the method are at the level of ASIL D requirements, for example $10^{-7}$ to $10^{-9}$ false positive detections per hour.

In the case of a positive detection, it should be checked whether the vehicle 1 is located on a route section FS approved for automated driving operation. The check shows that the vehicle 1 is located on the route section FS, and the vehicle 1 is also actually located on this route section FS. In the case of a false positive detection (false positive), it should be checked whether the vehicle 1 is on a route section FS approved for automated driving operation. The check shows that the vehicle 1 is located on this route section FS. However, the vehicle 1 is in fact located on another route section NFS, in particular on a route section NFS not approved for automated driving operation.

By way of example, the vehicle system 9 is based on a digital map 5, which is in particular high-resolution, in order to ensure safe automated driving operation. It must then be ensured that the correct digital map 5 or a correct map section KA of this digital map 5 is used, which corresponds to the route section FS on which the vehicle 1 drives. It must therefore not only be ensured that the vehicle 1 is located on a route section FS, for example on a motorway, which would in principle be suitable for the automated driving operation, but also that the vehicle 1 is located on the correct route section FS. This function is referred to as Road Path Integrity Monitoring.

During automated driving operation, the vehicle 1 requires detailed knowledge of a route ahead in order to plan driving maneuvers accordingly. Corresponding information from a vehicle sensor system 4, however, is limited in its range. Therefore, environmental information is provided by the, in particular high-resolution, digital map 5. For this purpose, however, the vehicle 1 must be correctly located in the digital map 5. A locally limited map section KA of this digital map 5, also referred to as the horizon or map horizon, is available in the vehicle 1. Together with the position of the vehicle 1, the map section KA provides an environmental model to support the sensory perception. This map section KA is selected based on a satellite-based position GNSSP of the vehicle 1.

FIG. 1 shows, as already mentioned, a localization of the vehicle 1, which gives a wrong result. A route section FS is depicted, for example a motorway, which is approved for the automated driving operation, and next to it a route section NFS, which is not approved for the automated driving operation, for example a main road or a service road of the motorway, which runs alongside the motorway.

The vehicle 1 is actually located on the route section NFS, which is not approved for the automated driving operation. By means of a localization method LMG based on at least one global navigation satellite system, a position GNSSP of the vehicle 1 is determined, which is located on the left side of the route section FS approved for the automated driving operation. Such incorrect localizations GNSSF are not uncommon.

Road features of the route section NFS not approved for automated driving operation determined by means of the vehicle sensor system 4, which lie within a detection range E of the vehicle sensor system 4, for example lane markings DF, GF, types of lane markings, here dashed lane markings GF and continuous lane markings DF, number of lanes, distances to edge boundaries RB and road features determined from the map section KA of the digital map 5 of the adjacent route section FS approved for automated driving operation, match one another in the depicted example, although the vehicle 1 is actually not located on the route section FS approved for automated driving operation. There are many such scenarios in the world where such errors can occur. The consequence of this incorrect localization is that the automated driving operation can be activated on the route section NFS that is not approved for automated driving operation.

Such errors, caused by incorrect localizations, can be avoided with the method described below. In this method for controlling the vehicle system 9 of the vehicle 1 equipped to carry out the automated, in particular highly automated or autonomous, driving operation, the vehicle 1 is localized and the vehicle system 9 is approved for activation depending on a result of the localization, i.e., depending on the respective result of the localization, the vehicle system 9 is either approved for activation or is not approved for activation.

The vehicle 1 is localized with at least two different localization methods LML, LMG, wherein the at least two localization methods LML, LMG comprise at least one landmark-based localization method LML and one GNSS-based localization method, i.e., the localization method LMG based on at least one Global Navigation Satellite System (GNSS), in particular a DGNSS-based localization method, i.e., a localization method LMG based on at least one Differential Global Navigation Satellite System. The vehicle system 9 is only approved for activation when each of the applied localization methods LML, LMG confirms that the vehicle 1 is on a route section FS approved for automated driving operation.

The device 2 depicted in FIG. 11 for carrying out this method is in particular equipped to carry out this method.

The method and the device 2 thus use, as shown in FIG. 2, a localization method with a combination of complementary mechanisms to verify that the vehicle 1 is actually located where it is localized by the localization methods LML, LMG, such that it can be assessed with a high degree of certainty whether the vehicle 1 is located on a route section FS approved for automated driving operation or not. With the localization method LMG, which is based on at least one global navigation satellite system, a protected lateral error transgression is taken into account, as described below. With the landmark-based localization method LML, a conclusive match of landmark signatures, which have been detected by means of the vehicle sensor system 4 and are contained in the digital map 5, is determined along a route xF which is passed by the vehicle 1. In addition, a plausibility check of the position GNSSP determined by means of the localization method LMG based on at least one global navigation satellite system, in particular longitudinal position, with the most probable position WP determined by means of the landmark-based localization method LML, in particular longitudinal position, is carried out. It is also checked whether lateral route profiles, in particular a route cross-section profile, from the digital map 5 and lateral profiles detected by the vehicle sensor system 4, in particular a route cross-section profile detected by the vehicle sensor system 4, match, but such matches are very common and in particular not stochastic.

FIG. 2 shows a process sequence of this localization method. The localization method comprises, as a method component VK1, the examination whether the route cross-section profile detected by means of the vehicle sensor system 4 and the route cross-section profile from the digital map 5 match. The route cross-section profile is a set of lateral distances between all edge boundaries RB and all lane markings DF, GF as well as a sequence of lane marking types.

Furthermore, as a further method component VK2, the localization method LMG based on at least one global navigation satellite system is carried out, wherein it is checked whether a lateral error upper limit PL is small enough to exclude a competing route section FS, NFS, such that no incorrect localization on a neighboring route section FS, NFS is possible.

In addition, the landmark-based localization method LML is carried out as a further method component VK3, and as a further method component VK4, it is checked whether the determined longitudinal position is plausible. If all these method components VK1, VK2, VK3, VK4 deliver a positive result, the road path integrity is given, i.e., the localization is almost certainly correct, such that a localization integrity RPI is present. Based on this localization, it is therefore certain whether the vehicle 1 is on a route section FS approved for automated driving operation, such that the vehicle system 9 is approved for activation, or whether this is not the case, such that the vehicle system 9 is not approved for activation.

In the GNSS-based localization method as a second method component VK2, i.e., in the localization method LMG based on the at least one global navigation satellite system, the position GNSSP of the vehicle 1 (GNSS position) is determined by satellite as shown in FIG. 3, an upper error limit PL for the expected deviation of an actual vehicle position GNSSP of the vehicle is determined and a target limit AL is defined in such a way that an area covered by the target limit AL does not comprise areas of adjacent roads. A confirmation that the vehicle 1 is located on a route section FS approved for automated driving operation is only issued if the determined upper fault limit PL is within the range covered by the target limit AL.

For the GNSS-based, in particular DGNSS-based localization method, i.e., for the localization method LMG based on the at least one global navigation satellite system, in particular differential global navigation satellite system, RAIM (Receiver Autonomous Monitoring) is used, for example. This is a method known from aeronautical engineering to assess the integrity (measure of confidence that can be placed in the determined GNSS position) of a determined GNSS position. RAIM is based on the fact that, for satellite-based localization, signals from four satellites are required, and that, if more than four satellites are available, a limit, i.e., the upper error limit PL (protection limit) around a localization point (GNSS position) can be defined, which contains the actual position of the vehicle 1 with a high degree of certainty.

The target limit AL, which is placed around the currently determined position GNSSP of the vehicle 1, defines the area in which the vehicle 1 must actually be located if the determination that the vehicle 1 is located on a route section FS approved for the automated driving operation is to be trusted. In particular, the target limit AL shall be predetermined in such a way that concurrent roads are excluded, i.e., small enough that an area enclosed by the target limit AL does not comprise positions on adjacent route sections NFS not approved for automated driving operation.

The upper error limit PL is determined and compared with the target limit AL. If the upper error limit PL is smaller than the target limit AL, the actual position of the vehicle 1 is definitely within the area enclosed by the target limit AL and thus with a high degree of certainty on a route section FS approved for automated driving operation. However, if the upper error limit PL is greater than the target limit AL, as shown in FIG. 3, it cannot be excluded that the vehicle 1 is located on a route section NFS not approved for automated operation, although the determined GNSS position is located on a route section FS approved for automated operation. In this case, the localization result is uncertain and will therefore not be taken into account when deciding whether to allow the automated driving operation. This means that the vehicle system 9 for carrying out the automated driving operation is not released for activation.

A probability of underestimating the upper error limit PL is very low, but can occur every $10^1$ to $10^7$ hours, for example, depending on system quality. For an automobile system, however, the $10^7$ hours, i.e., $10^7$ operating hours of the vehicle 1, are difficult to achieve, such that this risk is low. However, the false positive rate can be mathematically limited in any case.

With the landmark-based localization method LML as a third method component VK3, as shown in FIG. 4, a most probable position WP of the vehicle 1 in the digital map 5 and a similarity measure AM of the signature match is determined by comparing sensor-determined landmark signatures with landmark signatures taken from a, in particular high-resolution, digital map 5. For this purpose, the current (inaccurate) position GNSSP of the vehicle 1 is determined by satellite and the map section KA of the in particular high-resolution digital map 5 (HAD map) assigned to the current position GNSSP is downloaded from a server 7 external to the vehicle. Landmark objects LMK and thus landmark signatures are extracted from the digital map 5. With the vehicle sensor system 4, landmark signatures are recorded by sensors, i.e., landmark objects LMS are determined from sensor data SD of the vehicle sensor system 4. A comparison V of these landmark signatures is then performed.

For this purpose, a plurality of position hypotheses PH is created for the determined landmark signatures, which represent the position of the vehicle 1. By comparing the position hypotheses PH, it is checked which of the position hypotheses PH are most similar and how certain this similarity is. Where the similar position hypotheses PH accumulate, the position hypothesis PH corresponding to the most probable position WP in the digital map 5 is located. From the distribution of the accumulation, it can be seen how similar the landmark signatures are and with what certainty it can be assumed that the determined most probable position WP corresponds to the actual position. Thus a similarity measure AM is determined, which ensures that an error rate is smaller than a predetermined value. If the similarity measure AM is higher than a predetermined threshold of, for example 99.99%, the result is positive and the determined most probable position WP is considered valid. Otherwise, the result is negative and the determined most probable position WP is thus rejected as invalid.

A match of landmark signatures from the digital map 5 with landmark signatures detected by the vehicle sensor system 4 is therefore conclusive if a random match of such landmark signatures of this size and shape is statistically very unlikely. The residual value of the probability of such a random match can be limited mathematically. This probability is lower, the larger the landmark signature sets are, i.e., the more landmark signatures are compared, and the better the landmark signatures are classified. A false positive rate is predetermined, which is still acceptable and for which a required landmark set size is reached sufficiently quickly. By way of example, the false positive rate is specified in such a way that a random match occurs only every 10 to 1000 hours.

A confirmation that the vehicle 1 is located on a route section FS approved for automated driving operation is only issued if the most probable position WP is located on the route section FS approved for automated driving operation and if the determined similarity measure AM exceeds the predetermined similarity threshold.

In the following, FIGS. 5 to 7 are used to explain an exemplary procedure for landmark-based localization in detail. This procedure comprises three steps. In the first step, a comparison VLM of the landmark objects LMS from the digital map 5 is carried out, as shown in FIG. 5. For this purpose, possible landmark objects LMS are determined from the sensor data SD of the vehicle sensor system 4 of the vehicle 1 by determining spatial patterns of the possible landmark objects LMS over the distance xF of the vehicle 1. From the map section KA, landmarks LMK recorded on the digital map 5 are determined by determining special patterns of LMK landmarks in the same spatial frame over a map path xK. Now the comparison VLM of these landmark objects LMS, LMK, more precisely a comparison VLM of the patterns of the landmark objects LMS, LMK is carried out. From this, the position hypotheses PH are determined. Advantageously, all LMS landmark objects detected by the vehicle sensor system 4, in particular also landmark objects LMS already passed by vehicle 1, are taken into account. The comparison thus takes place with written down distributions of landmark objects LMS, i.e., based on the landmark signatures.

During the comparison VLM, all possible matches are taken into account, not only closest points, such that a plurality of position hypotheses PH are determined. Each position hypothesis PH has a spatial uncertainty based on measurement noise, map errors, and odometry uncertainties.

In the second step, a probabilistic analysis PA is carried out, as shown in FIG. 6. By analyzing all position hypotheses PH and filtering out all false information by means of the probabilistic analysis PA, a position hypothesis PHI with an integrity value is determined. For this purpose, the probabilistic analysis PA is carried out with the position hypotheses PH, a distribution model VII of misleading information and a distribution model VKI of correct information. This results in the position hypotheses PHI with the integrity value.

An incorrect piece of information follows a distribution that is different from the correct information, normally very independent of the actual position, for example an equal spatial distribution. The non-outlier matches are necessarily related to the actual position and form any possible spatial shape around it, for example a Gauss distribution. If one analyzes all position hypotheses PH in relation to each other, one obtains an estimate of the probability that each of them comes from one of the two distributions, and thus of their probability of being misleading information.

In the third step, an integration of information occurs, as shown in FIG. 7. By filtering F according to predetermined limits of integrity, a position hypothesis PHP with a positional accuracy which is, in particular in a predetermined way, sufficient to determine the position of the vehicle 1 is determined. Subsequently, an integration II of this information occurs in order to determine an upper error limit PLL of the landmark-based localization method LML.

The position hypotheses PHI with an integrity value are filtered according to their chances of being misleading information. The threshold depends on the desired false positive rate for the error excess. The lower the threshold value, the fewer position hypotheses PHI with an integrity value are considered to be good enough, i.e., to have a sufficient positional accuracy.

The plausibility check, i.e., a plausibility evaluation P, occurs as the fourth method component VK4, as already described above. As shown in FIG. 8, the most probable position WP, in particular the longitudinal position, determined by means of the landmark-based localization method LML, is compared in a position comparison PV with the satellite-based determined position, i.e., with the position GNSSP determined by means of the localization method LMG based on at least one global navigation satellite system, in particular longitudinal position, and is only evaluated as plausible if the two determined positions WP, GNSSP are close to each other, in particular within a given maximum distance from each other. This means that the plausibility evaluation P only has a positive result. Otherwise, the determined most probable position WP is rejected as implausible, i.e., the plausibility evaluation P has a negative result. A confirmation that the vehicle 1 is on a route section FS approved for automated driving operation is only issued if the most probable position WP determined has been assessed as plausible.

It is unlikely that the landmark-based localization method LML and the localization method LMG based on the at least one global navigation satellite system will yield the same error. Therefore, it can be assumed that the positions WP, GNSSP, in particular longitudinal positions determined with these two methods, are free of errors and thus plausible if they are close to each other. In this way, the false positive rate of the road path integrity, i.e. the localization integrity RPI, is reduced by another order of magnitude.

Finally, the upper error limit PL, PLL of position information PI is explained. FIG. 9 shows an unknown actual distribution of errors between the negative and positive upper error limits PL, PLL. ρ is the mean value and sigma is the root of the normalized sum of the deviations from the mean value. FIG. 10 shows an assumed distribution of errors.

The specified accuracy is the typical deviation from the actual value, i.e., sigma of the actual distribution. The specified error limit PL, PLL is a boundary box that contains all errors apart from $10^{-7}$, for example. The specified availability is the percentage of time in which the system can provide the upper error limit PL, PLL.

The accuracy can be verified to a large extent with large test samples and a basic truth reference. An online optimization also generates sigma values to indicate the estimated accuracy, but this is based on a model distribution of errors, which can differ significantly from the actual distribution. Therefore, this is not the real precision, and definitely not sufficient to determine an error upper limit PL, PLL, such that an additional monitoring is necessary.

The device 2 shown in FIG. 11 for carrying out the method comprises in particular at least one receiver 3 for signals of at least one global navigation satellite system and a vehicle sensor system 4, in particular comprising at least one sensor or a plurality of identical and/or different sensors, for detecting landmark signatures. Furthermore, the device 2 comprises in particular at least one digital map 5 and/or, as depicted here, at least one communication interface 6 for communication with a server 7 external to the vehicle for downloading at least one map section KA of the digital map 5. In addition, the device 2 comprises in particular at least one processing unit 8. Depending on a result determined by the device 2 by means of the method, the vehicle system 9 is either approved for activation or not approved.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling a vehicle system of a vehicle, which is equipped to perform automated driving operation, the method comprising:
   localizing the vehicle with at least two different localization methods, wherein the at least two localization methods comprise at least one landmark-based localization method and one localization method based on at least one global navigation satellite system; and
   approving the vehicle system for activation depending on a result of the localization, wherein the vehicle system is only approved for activation if it is confirmed with each of the applied localization methods that the vehicle is located on a route section approved for automated driving operation.

2. The method of claim 1, wherein the landmark-based localization method comprises:
   comparing sensor-determined landmark signatures with landmark signatures takes from a digital map to determine a most probable position of the vehicle in the digital map and a similarity measure of the comparison of sensor-determined landmark signatures with landmark signatures.

3. The method of claim 2, wherein a confirmation that the vehicle is located on a route section approved for automated driving operation is only issued if
   the determined most probable position is located on the route section approved for automated driving operation, and
   the determined similarity measure exceeds a predetermined similarity threshold.

4. The method of claim 2, further comprising:
   comparing the determined most probable position with a position determined by the localization method based on the at least one global navigation satellite system.

5. The method of claim 4, wherein the determined most probable position is evaluated as plausible if the determined most probable position and the position determined by the localization method based on the at least one global navigation satellite system are within a predetermined maximum distance from each other.

6. The method of claim 5, wherein a confirmation that the vehicle is on a route section approved for automated driving operation is only issued if the determined most probable position has been evaluated as plausible.

7. The method of claim 1, wherein the localization method based on at least one global navigation satellite system comprises:
   determining a current position of the vehicle using the at least one global navigation satellite system;
   determining an upper error limit for an expected deviation of an actual vehicle position from the current position of the vehicle determined using the at least one global navigation satellite system;
   defining a target limit in such a way that an area encompassed by the target limit does not encompass areas of adjacent roads,
   wherein a confirmation that the vehicle is on a route section approved for automated driving operation is only issued if the determined upper error limit lies within the area encompassed by the target limit.

8. The method of claim 2, wherein the landmark-based localization method comprises:
   downloading, by the vehicle, a map section of the digital map from a server external to the vehicle, wherein the map section is assigned to a current position of the vehicle, and wherein the current position of the vehicle is determined by the localization method based on the at least one global navigation satellite system.

9. A device for controlling a vehicle system of a vehicle, which is equipped to perform automated driving operation, the device comprising:
   a global navigation satellite system receiver;
   a vehicle sensor system; and
   a processing unit coupled to the global navigation satellite system receiver and the vehicle sensor system, wherein the processing unit is configured to
   localize the vehicle using a landmark-based localization using information from the vehicle sensor system and a localization based on signals received by the global navigation satellite system receiver; and
   approve the vehicle system for activation depending on a result of the localization, wherein the vehicle system is only approved for activation if it is confirmed that the localizations using the landmark-based localization based on the signals received by the global navigation satellite system receiver both indicate that the vehicle is located on a route section approved for automated driving operation.

* * * * *